Oct. 22, 1940.   O. D. JENNINGS ET AL   2,218,821
PARKING METER
Filed Jan. 17, 1938   8 Sheets-Sheet 2

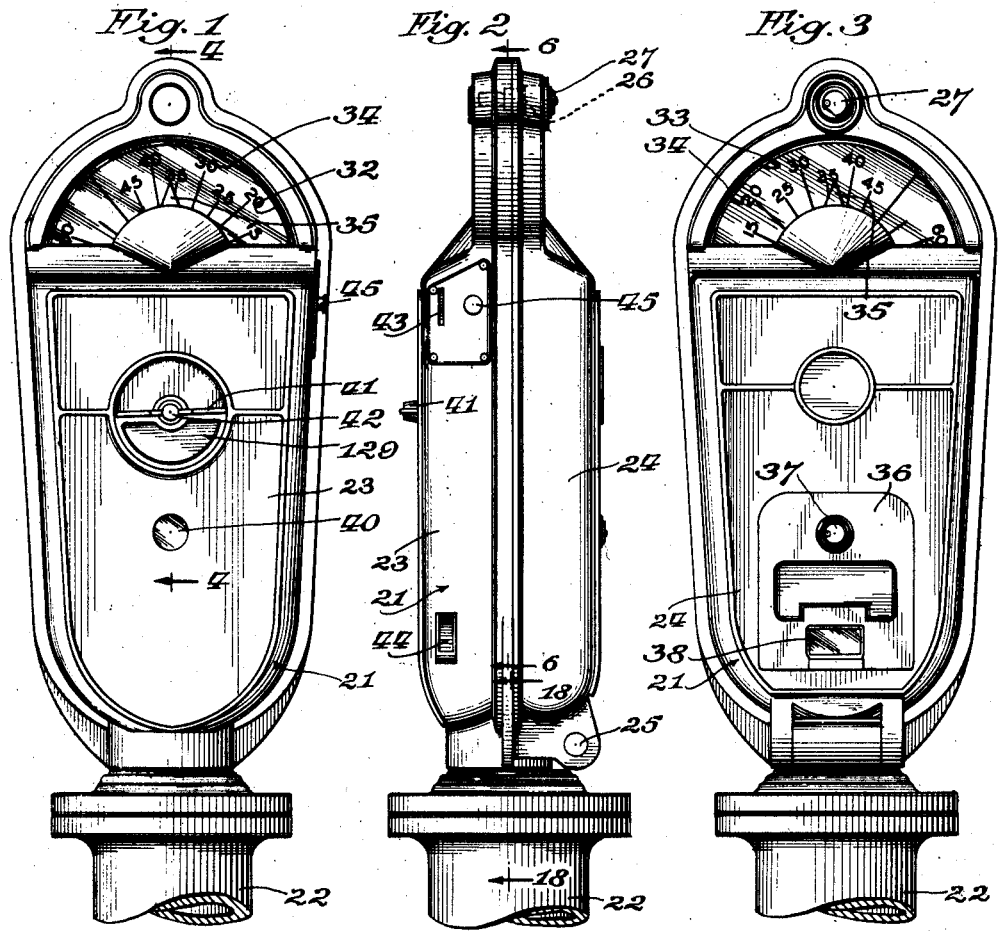
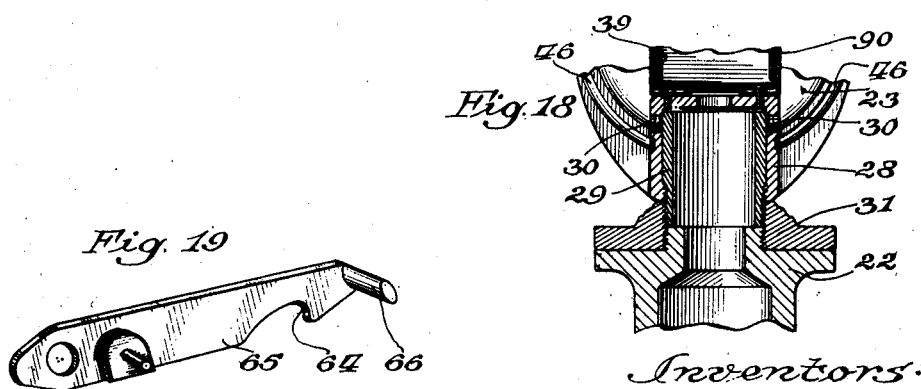

Inventors:
Ode D. Jennings
Sidney E. VanTuyl
Emery Mihalek
By Williams, Bradbury,
McCaleb & Hinkle
Attys.

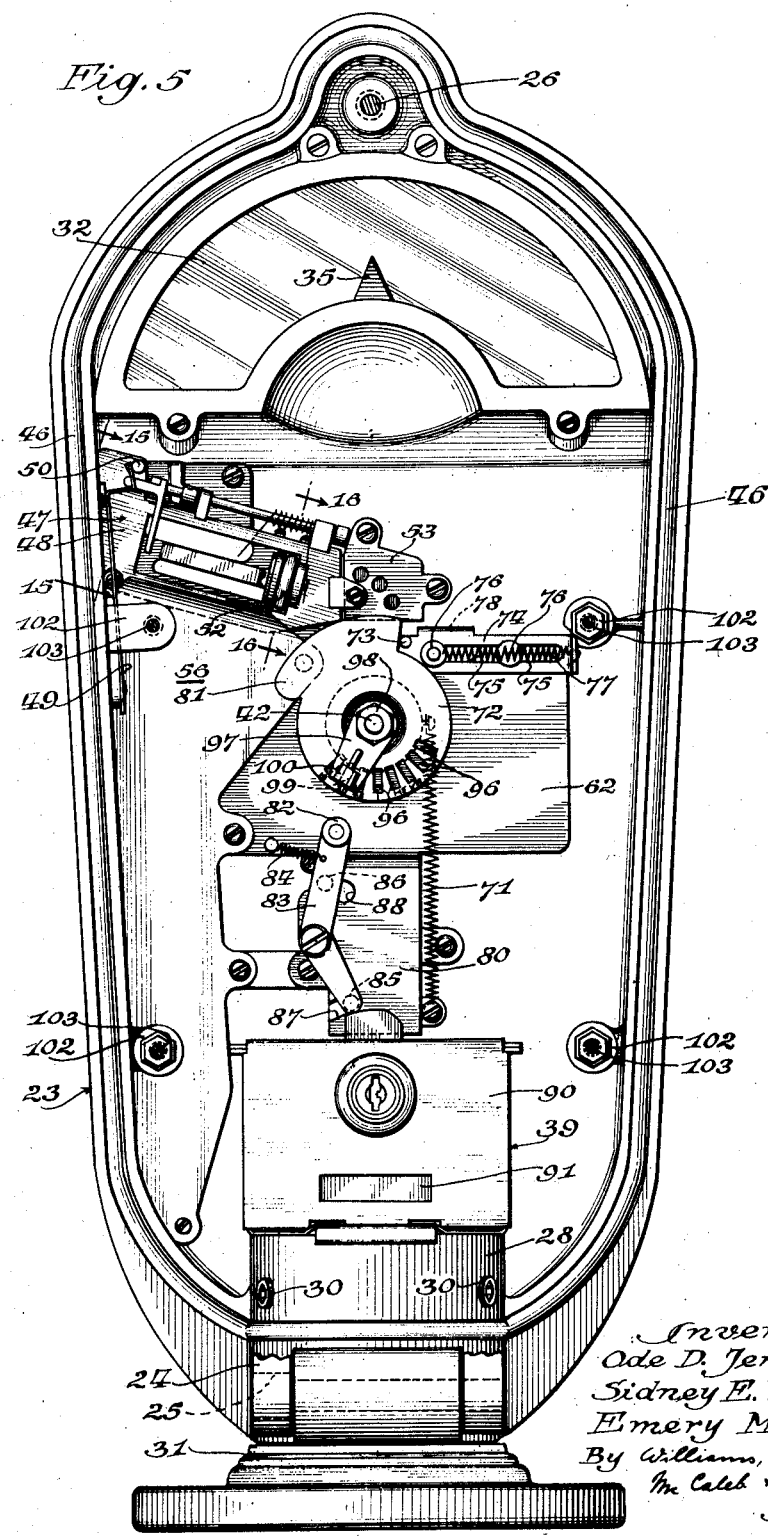

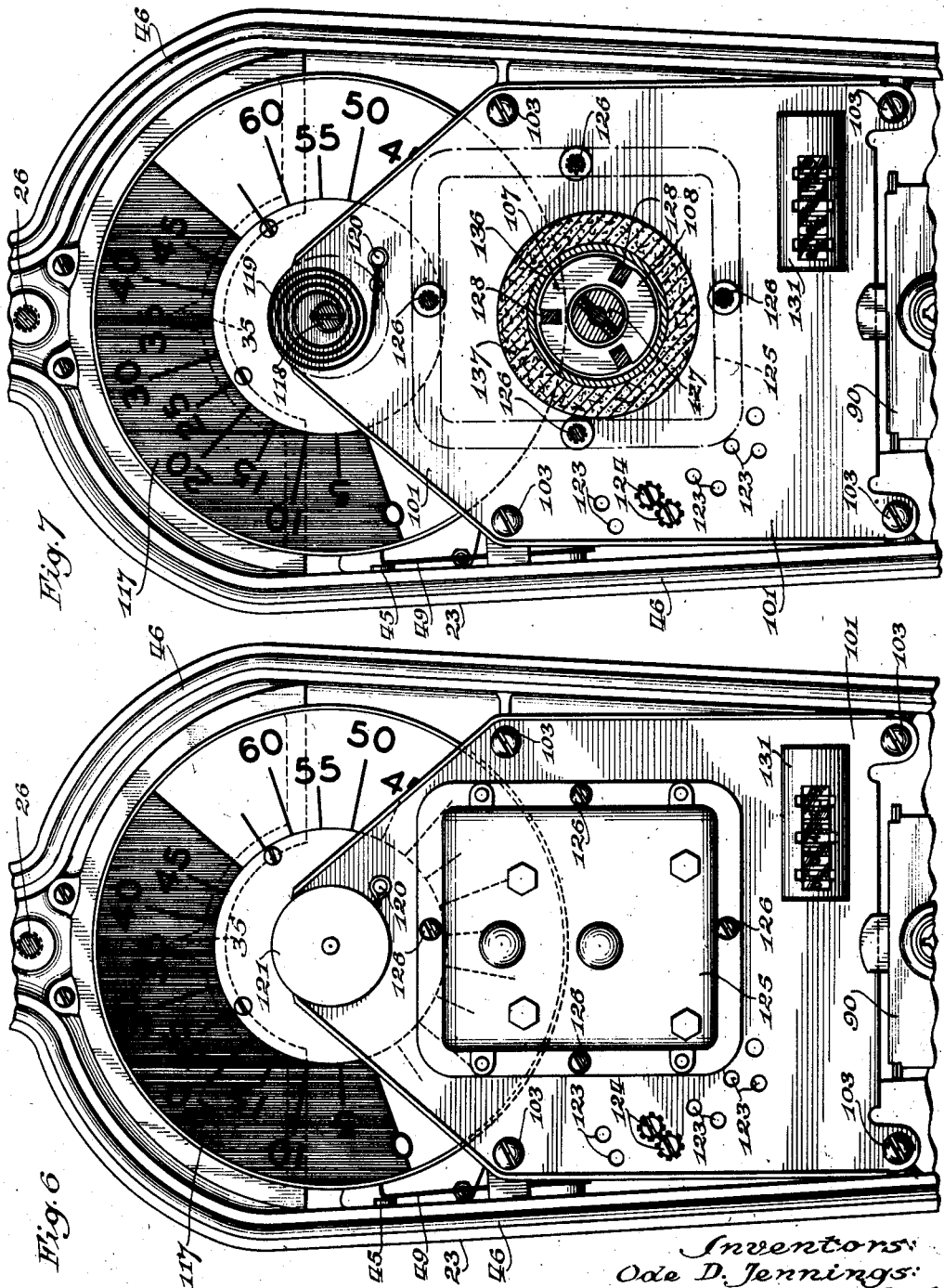

Oct. 22, 1940.   O. D. JENNINGS ET AL   2,218,821

PARKING METER

Filed Jan. 17, 1938   8 Sheets-Sheet 5

Inventors:
Ode D. Jennings
Sidney E. Van Tuyl
Emery Mihalek
By Williams, Bradbury, McCaleb & Hinkle
Attys.

Oct. 22, 1940.   O. D. JENNINGS ET AL   2,218,821
PARKING METER
Filed Jan. 17, 1938   8 Sheets-Sheet 6

Inventors:
Ode D. Jennings
Sidney E. Van Tuyl
Elmery Mihalek
By Williams, Bradbury,
McCaleb + Hinkle
Attys.

Oct. 22, 1940.  O. D. JENNINGS ET AL  2,218,821
PARKING METER
Filed Jan. 17, 1938   8 Sheets-Sheet 7

Inventors
Ode D. Jennings
Sidney F. Van Tuyl
Emery Mihalek
By Williams, Bradbury, McCaleb & Hinkle
Attys.

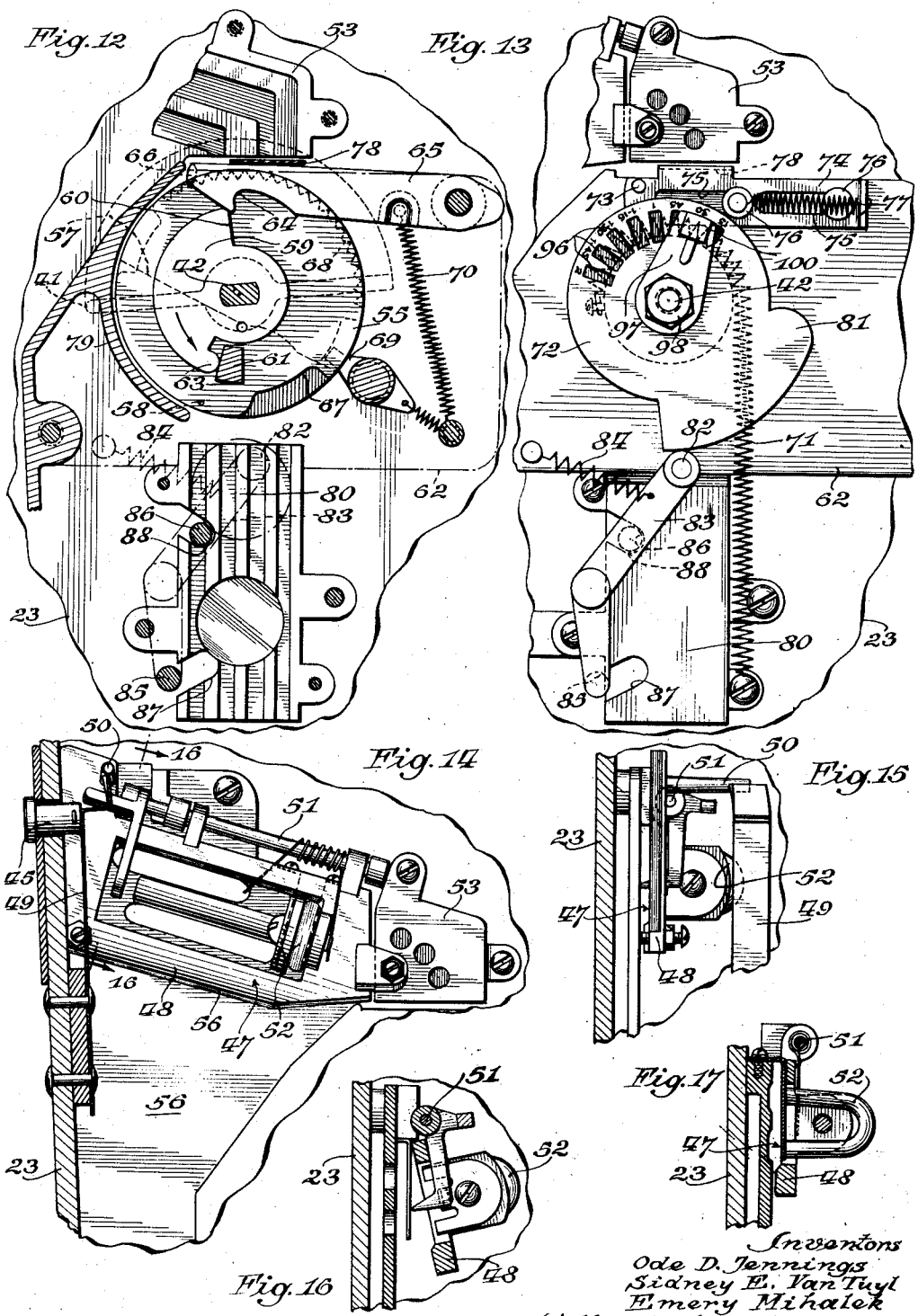

Patented Oct. 22, 1940

2,218,821

UNITED STATES PATENT OFFICE 2,218,821

PARKING METER

Ode D. Jennings, Schaumburg Township, Cook County, and Sidney E. Van Tuyl and Emery Mihalek, Chicago, Ill., assignors to O. D. Jennings and Company, Chicago, Ill., a corporation of Illinois Application January 17, 1938, Serial No. 185,345

4 Claims. (Cl. 161—15)

This invention relates to parking meters and has for its principal object to provide an improved parking meter which is simple in operation and economical to manufacture.

A further object of the invention is to provide an improved parking meter in which the elements are arranged so as to facilitate removal and repair or replacement of parts most likely to go out of order.

A further object of the invention is to provide an improved parking meter in which clockwork elements are located in several parts of the device and are connected through gearing and an overrunning clutch in which means are provided to minimize back-lash.

Other objects, advantages and capabilities of the invention will appear from the following description of a preferred embodiment thereof, taken in conjunction with the accompanying drawings, in which:

Figure 1 is a front elevational view of a parking meter embodying our invention;

Fig. 2 is a side elevational view thereof;

Fig. 3 is a rear elevational view;

Fig. 5 is a sectional elevation of the parking meter with the movable housing member removed, the section being taken on the broken line 5—5 of Fig. 4;

Fig. 6 is a fragmentary elevational view of the parking meter, one of the housing members being removed;

Fig. 7 is a fragmentary sectional elevational view, the section being taken on the line 7—7 of Fig. 4;

Fig. 12 is a sectional detail view similar to Fig. 11, showing the parts therein in a different position;

Fig. 13 is a fragmentary elevational view similar to Fig. 5, showing the elements in a different position;

Fig. 14 is a sectional detail view showing the coin ejecting elements.

Figs. 15, 16 and 17 are fragmentary sectional detail views showing the coin ejector in different positions of adjustment;

Fig. 18 is a sectional detail view showing the manner in which the meter is mounted, and Fig. 19 is a perspective view of a lever.

Figure 4:
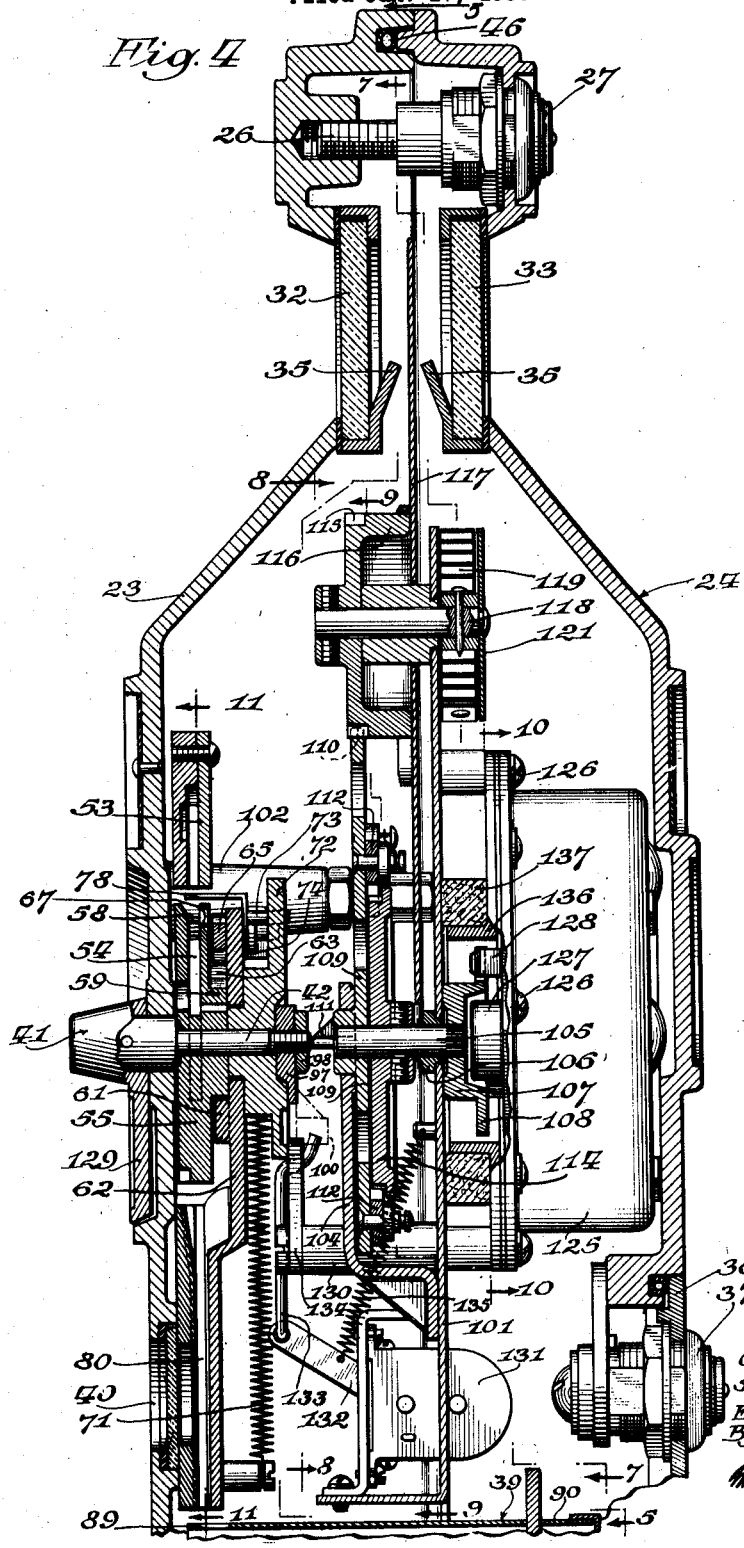
Fig. 4 is a fragmentary longitudinal sectional view through the upper part of the parking meter, the section being taken on the line 4—4 of Fig. 1.

Referring to the drawings, the parking meter comprises a housing 21 which is adapted to rest on the top of a pillar 22 at a suitable location, for example, along the curb where parking is permitted. The housing 21 comprises two complementary housing members 23 and 24. The housing member 23 is mounted directly upon the standard 22. The housing member 24 is pivotally mounted on the housing member 23 at 25. The two housing members are held closed by means of a bolt 26 which may be actuated by the aid of a key inserted in a lock 27 to which the bolt 26, at the upper end of the housing, is attached.

The housing member 23 terminates at its lower end in a socket 28 which is adapted to receive a nipple 29. The nipple 29 may be secured within the socket by suitable set screws 30 which are available whenever the housing member 24 is swung into its open position about the pivot 25. The nipple 29 may be secured in any suitable way to the standard 22, for example, it may have threaded thereto a base 31 which is threaded to the standard 22 and rests thereon.

Suitable means (not shown) may be provided to prevent removal of the nipple 29 from the base 31, or the base 31 from the standard 22. Consequently, the meter housing can be removed only by an authorized person who is able to open the housing.

While the meter housing may taken any suitable form, that shown in Figs. 1, 2 and 3 is preferred. The housing in this form comprises a gracefully curved container which provides in its lower part sufficient space for the mechanism. The upper end of the housing is made thin, as best shown in Fig. 2, and the walls at this position are provided with windows 32 and 33, which windows are of fan formation so as to display the effective portion of a time disc 34 inside the housing.

Adjacent portions of the housing members are formed into points 35 which indicate the effective position of the time disc at any moment. Suitable means are provided along the meeting edges of the housing members for protection against the weather. This means may suitably consist of a rubber gasket 46 which is compressed into a marginal groove around one housing member by a complementary rib on the other housing member.

The housing member 24 is provided with a removable door 36 which is controlled by a lock 37. The door 36 is provided with a small window 38 whereby the presence of a cash box 39 within the meter can be ascertained at any time.

The housing member 23 is provided with a small window 40 at which the coin last inserted is held for inspection. The housing member 23 also carries a handle 41 which may be actuated manually after a coin of the appropriate denomination is inserted. The handle 41 is rigidly mounted on a shaft 42. The housing member 23 is also provided with a coin opening 43 for the insertion of a coin. Means are provided whereby the device will not accept spurious coins. These coins are held by selector means and are returned to the operator at the outlet 44 when a button 45 is pressed.

The coin opening 43 delivers a coin into a chute 47 which slopes downwardly as shown in Fig. 5. The chute comprises a gate portion 48 which may be swung inwardly by pressing the button 45. As shown in Fig. 14, this button cooperates with a spring leaf 49 on the inner side of the housing and this leaf cooperates with a pin 50 carried on the gate 48 so as to swing the gate about its pivot bar 51.

The gate 48 carries a magnet 52 for arresting magnetic slugs and it may be adapted, in known manner, to reject undersized and bent coins. The coin chute 47 terminates in an end piece 53 which directs the coin downwardly into a pocket 54 in a disc member 55 rigidly mounted on the shaft 42. On the inner side of the gate 48 is provided a chute 56 which delivers rejected coins to the outlet 44.

Figure 11:
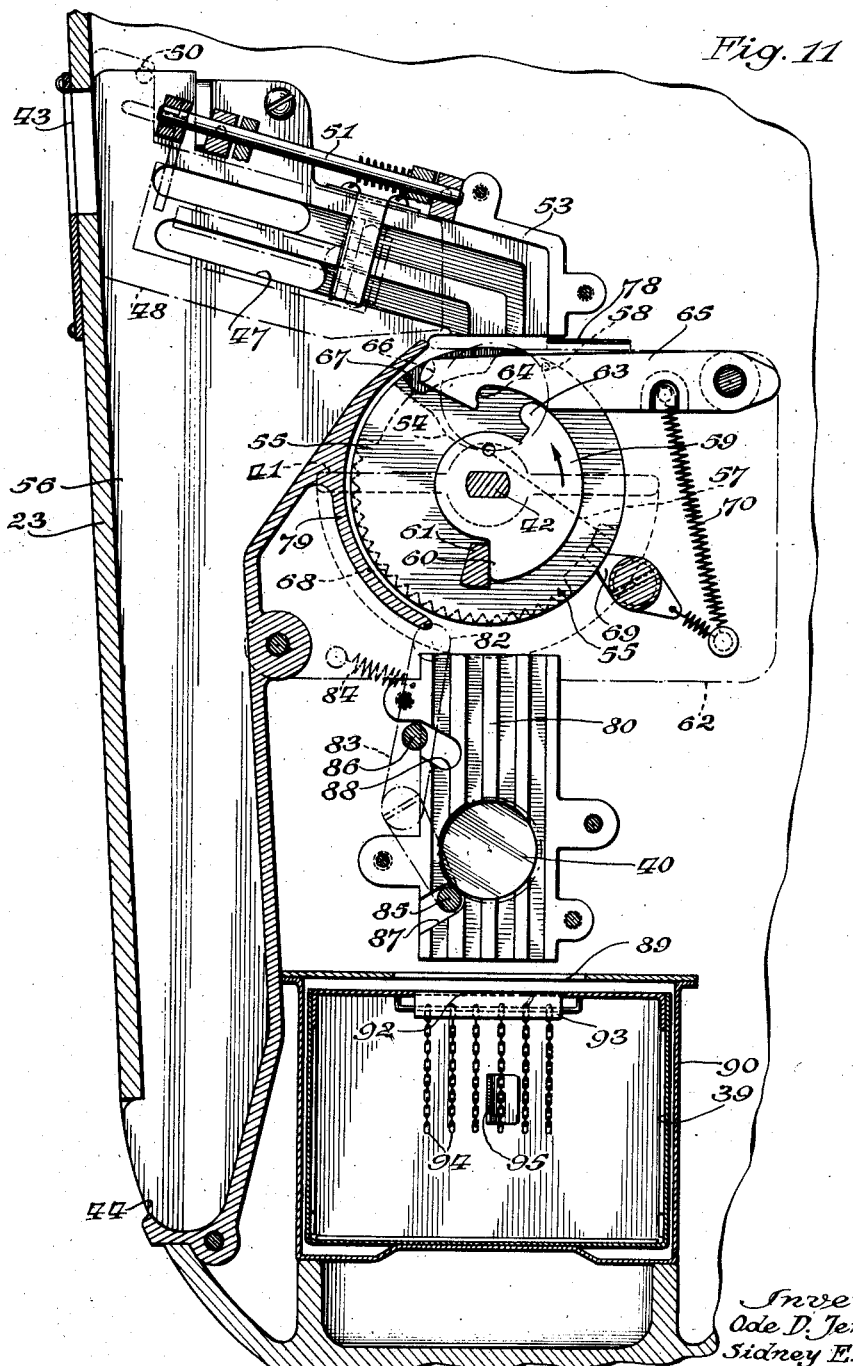
Fig. 11 is a fragmentary sectional view, taken on the line 11—11 of Fig. 4.

The pocket 54 in the disc 55 corresponds to a large segment of the area of the disc, its inner edge being indicated by the dotted line 57 on Fig. 11. The disc is shown in its initial or normal position in this figure, and a coin dropped into the slot 54 is held in the position shown in dotted lines by a pin 58. This pin enables coins smaller than standard size to roll downwardly along the bottom 57 of the slot 54.

On its inner side the disc carries a formation 59 which includes an abutment portion 60 which is normally in contact with an abutment 61 carried by a rigid frame member 62 located within the housing. The formation 59 also provides a projection 63 which is adapted to be received by a recess 64 on a pivoted lever 65 except when that lever is elevated from the position shown in Fig. 11. The lever 65, which is best shown in Fig. 19, is provided with a laterally extending projection 66 which normally extends through a recess 67 in the marginal portion of the disc 55 across the slot 54.

When the handle 41 is actuated by turning it in the clockwise direction as viewed in Fig. 1, which corresponds to the counter-clockwise direction as viewed in Fig. 11, the coin is carried with the disc into engagement with the projection 64 so that the lever 65 is raised out of the path of the projection 63. Consequently, the disc 55 may be rotated through substantially half a revolution, which rotation is ultimately arrested by the engagement of the projection 63 with the stop 61. A portion of the periphery of the disc 55 is provided with teeth 68 which engage with the swinging pawl 69 to constitute a full stroke mechanism.

The lever 65 is biased downwardly by means of a spring 70 so that it normally occupies the position shown in Fig. 11. When the lever is elevated by a coin and the disc 55 is rotated, the projection 66 rides on the edge of the disc to the right of the recess 67 and when the disc returns to its initial position the projection 66 falls into the recess 67 and allows the lever 65 to resume its normal position.

The disc 55 is biased towards its normal position by means of a spring 71, Fig. 5, which is secured to the boss of a disc 72 also rigidly mounted on the shaft 42. The normal position of the shaft 42 is determined by a pin 73 mounted on a sliding frame 74 which is supported on the frame member 62.

The sliding frame 74, which may be fabricated of sheet material, comprises slots 75 through which extend large headed pins 76 so that the frame may oscillate in a horizontal direction. The frame 74 is biased towards the left, as viewed in Fig. 5, by a spring which is connected to one of the pins 76 and to the inwardly turned end of the frame 74. The spring 77 is relatively weak so that it is overcome by the spring 71 acting through the disc 72. When the disc 72 is rotated in counter-clockwise direction, as viewed in Fig. 5, that is, when the handle 41 is rotated in the clockwise direction as viewed in Fig. 1, the spring 77 causes the frame 74 to move to the left, as viewed in Fig. 5, so as to bring a projecting flange 78 on the frame 74 into a position below the end piece 53 of the coin slot. Consequently, in the event that two coins are inserted before the handle is turned, the second coin is held in the coin chute until after the disc 55 returns to its initial position.

When the coin travels with the disc 55 from its initial position, the coin is held in the pocket 54 by a stationary arcuate wall 79. When the coin clears the lower extremity of this wall it drops from the pocket 54 into a coin chute 80 immediately below the shaft 42 which is in part constituted by the frame member 62 previously referred to. This coin chute is open to the window 40.

The disc 72 is provided with a cam formation 81 which is adapted to cooperate with a roller 82 on a bent lever 83 which is pivotally mounted on the outside of the coin chute 80. The lever 83 is biased into the position shown in Fig. 5 by a spring 84. It carries two pins 85 and 86 which extend through slots 87 and 88, respectively, into the coin chute 89. When in the normal position shown in Fig. 5, the pin 85 holds a coin in alignment with the window 40.

The cam formation 81 engages the roller 82 during the rotation of the handle 41, with the result that the pin 85 is withdrawn from the coin chute 80 and the pin 86 is moved into coin-obstructing position in the slot 87. Consequently, the coin in alignment with the window 40 drops downwardly into an opening 89 in a box 90, which box has a window 91 in alignment with the window 38 previously referred to. The box 90 serves as an enclosure for the cash box 39 previously referred to. The box 39 is provided with a slot 92 in alignment with the slot 89. The slot 92 may be protected against surreptitious removal of coins by means of flanges 93, chains 94, and obstructions 95, or by other suitable means.

After the lever 83 has been moved by the cam 81 into coin-obstructing position, the next coin drops down from the pocket 54 into the upper part of the slot of the coin slot 80. When the lever 81 returns to its normal position, the lever 83 moves to its normal position and the coin thus arrested by the pin 86 is freed to drop down into engagement with the pin 85. Consequently, this coin remains in that position until another coin is inserted and the handle 41 again actuated.

The disc 72 is provided with a series of radial recesses 96 which are adapted to insure the correct location of an arm 97 on the rear face of the disc 72. This arm 97 is secured to the shaft 42 by means of a nut 98. The arm 97 includes a formation 99 which is adapted to enter one of the openings 96. The arm 97 carries an exterior abutment 100, the purpose of which will hereinafter be described. It may here be noted that the various openings 96 correspond to various periods for which the device may be set. The periods may be indicated by numbers such as 15, 30, 45, 1, 1—15, etc., corresponding to 15 minutes, 30 minutes, 45 minutes, 1 hour, 1 hour 15 minutes, etc.

The remaining mechanism of the meter is mounted on a plate 101 which is secured to posts 102 on the inside of the housing member 23 by screws 103. On its front side, that is, the side next to the handle 41, it carries a bracket 104 which serves as a bearing for a shaft 105 which also extends through a bearing 106 on the plate 101. On the opposite side of the plate 101 from the bracket 104 the shaft 105 rigidly carries a wheel 107 which is provided with a notched flange 108.

Adjacent the bracket 104 the shaft 105 freely carries a disc 109 which is provided with an extension in the form of a sector 110. The disc 109 is provided with an abutment 111 which lies in the path of the abutment 100 on the arm 97. When the handle 41 is rotated in the clockwise direction, as viewed in Fig. 1, the disc 109 and sector 110 are swung in the same direction as viewed in Fig. 8, owing to the engagement between the abutment 100 and the abutment 111. Since the handle 41 is permitted to rotate approximately 180 degrees, it is apparent that the extent to which the sector 110 is rotated depends primarily upon the position of the arm 97 with respect to the disc 72.

On its inner side, that is, the side adjacent the plate 101, the disc 109 carries a circumferential series of pawls 112. These pawls are pivotally mounted on the disc 109 and are biased inwardly by means of springs 113 so that the inner points of the pawls engage the teeth of a ratchet wheel 114 which is rigidly mounted on the shaft 105 immediately adjacent the disc 109.

Figure 8:
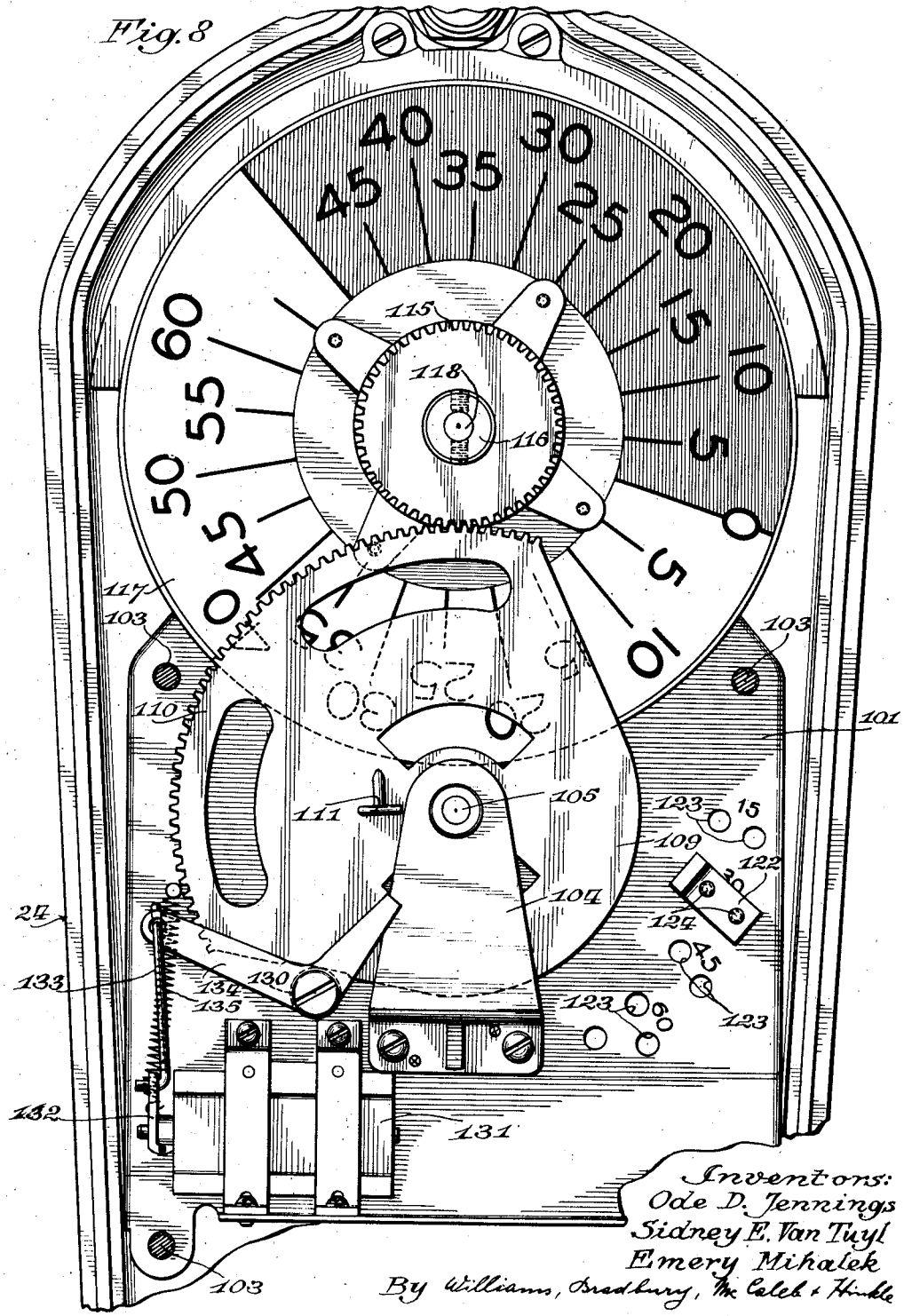
Fig. 8 is a fragmentary sectional view, the section being taken on the line 8—8 of Fig. 4.
Figure 9:
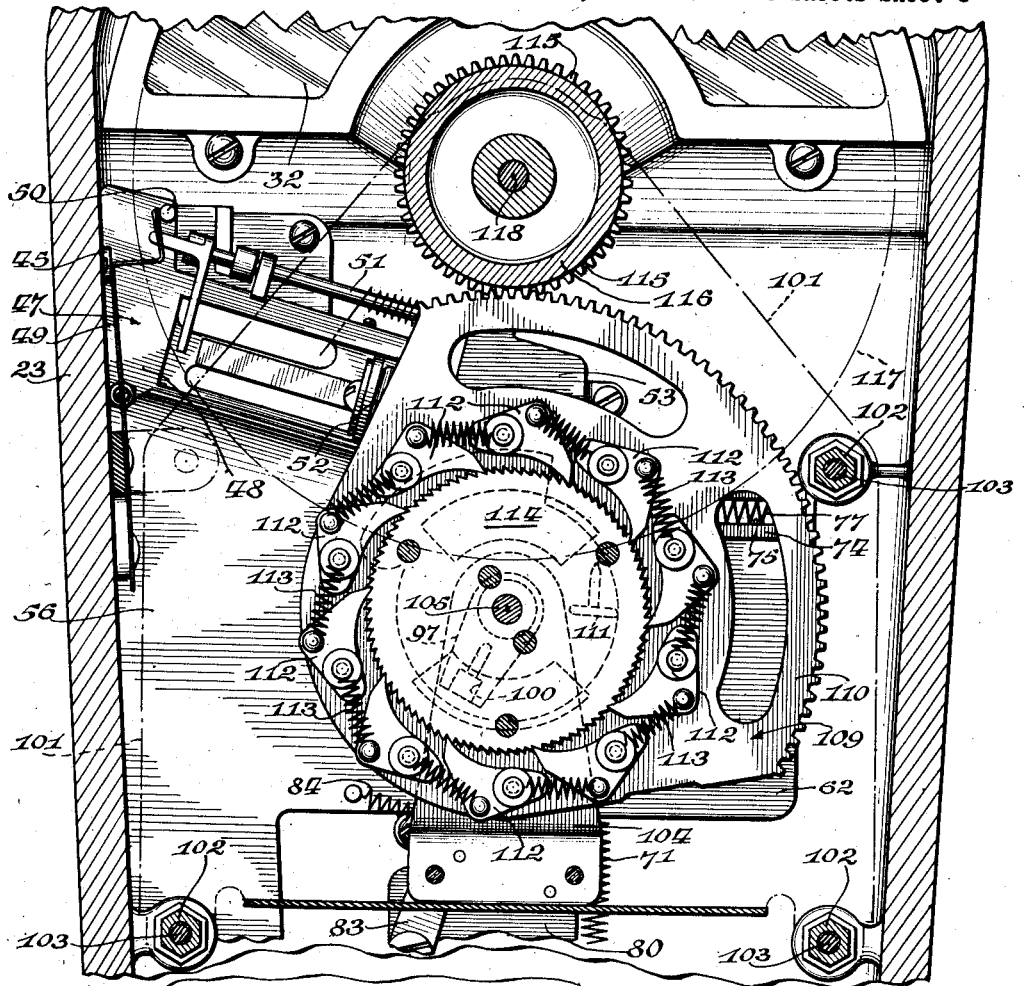
Fig. 9 is a sectional elevational view, the section being taken on the line 9—9 of Fig. 4.
Figure 10:
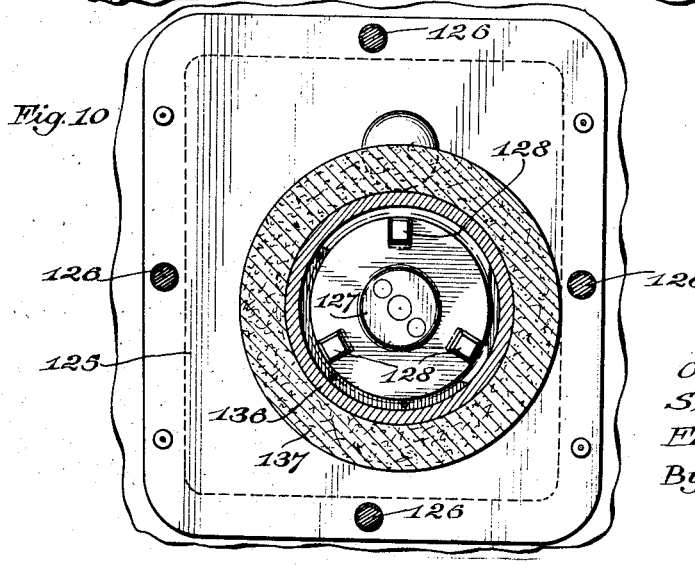
Fig. 10 is a sectional elevational view, the section being taken on the line 10—10 of Fig. 4.

It will be noted from Figs. 8 and 9, which are views taken in the opposite direction, that when the handle 41 is actuated to swing the disc 109 in the clockwise direction as viewed in Fig. 8, that is, the counter-clockwise direction as viewed in Fig. 9, the pawls 112 slip freely over the teeth of the ratchet wheel 114. When, however, the disc 109 is rotated in the opposite direction, the pawls 112 drive the ratchet wheel 114 in the clockwise direction as viewed in Fig. 9. The number of pawls 112 and the number of teeth on the ratchet wheel 114 are correlated so that there is no factor common to both of them. Thus, for example, we show ten pawls and 91 teeth. The pawls are equidistantly arranged around the ratchet wheel 114 and, consequently, the operating surface of adjacent pawls is spaced apart by 9.1 tooth spaces. Consequently, the amount of back-lash is always less than 1/10 of a tooth. Of course, it is to be understood that any suitable number of pawls and any suitable number of teeth may be employed for this purpose.

The sector portion 110 of the disc 109 is provided with teeth which mesh with a pinion 115 which is integral with a hub 116 which is secured to a time disc 117. The hub 116 is mounted on a shaft 118 which has a bearing in the upper part of the plate 101. The shaft 118 extends through the bearing to the opposite side of the plate 101, that is, the side remote from the handle 41. The rearward end of the shaft 118 has anchored thereto a coil spring 119, one end of which is anchored to a pin 120 on the plate 101. The shaft 118 may carry a disc 121 at its rear extremity to prevent displacement of the spring 119.

The plate 101 has adjustably mounted thereon a bracket 122 which serves as a stop for the sector disc 109. This abutment is located at a position so that it may become effective when the handle 41 sets the time disc. The plate 101 may be provided with a series of pairs of openings 123 corresponding to 15, 30, 45, and 60 minutes, etc., the bracket 122 being mountable at any of these pairs of openings by means of screws 124. When the sector disc 109 is rotated in the clockwise direction, as viewed in Fig. 8, until it comes into contact with the bracket 122, the time disc 117 is rotated in the counter-clockwise direction until the numerals 30 on the white portion of the disc are moved up into alignment with the pointers 35 to indicate that the operator may park for 30 minutes.

It may here be noted that part of the disc 117 is painted red, corresponding to the shaded area, and when this part of the disc is in register with the pointers 35 it is shown that the person whose car is located in front of the parking meter has over-stayed his period. The degree of over-parking is indicated by the numerals on the red part of the disc. When the disc sector 109 is rotated in the clockwise direction, as viewed in Fig. 8, and the disc 117 is rotated in the manner stated, the spring 119 is wound up and tends to reverse the direction of the disc 117 and to drive the sector disc 109 in the counter-clockwise direction, as viewed in Fig. 8.

Immediate reversal of these elements is prevented by means of a clock escapement unit 125 which is mounted on the rear side of the plate 101, as shown in Fig. 4. This escapement unit is located within the housing which is secured to the plate 101 by means of screws 126 and includes a wheel 127 which is in alignment with the shafts 42 and 105 when the meter is assembled. The wheel 127 carries projections 128 which are adapted to be received by notches in the flange 108 of the wheel 107.

The handle 41 is provided with a semi-circular extension 129 which is normally located in the position shown in Fig. 1. The portion of the housing below this normal position of the extension 129 is of a contrasting color with respect to the color of the rest of the meter. Thus, it may be red and the meter housing and the extension 129 may be green.

We may provide a counter mechanism 131 which may be mounted on the plate 101. This counter may be of any suitable type and it may be actuated by an arm 132 which is connected by a link 133 to a bell crank lever 134 pivotally mounted on a post 130. The lever 132 is mounted in one position by means of a spring 135 and it may be actuated in the opposite direction each time that the meter is operated by the engagement of the cam 81 with the end of the bell crank lever 134.

In order to prevent the entrance of dust into the housing in the escapement mechanism 125, we provide the cover of this housing with an annular mouth 136 which extends almost to the plate 101. We provide a felt gasket 137 around the mouth 136, this gasket being of such size that it is compressed when the escapement housing is mounted in position on the plate 101.

The operation is as follows: The meter being set for 30 minutes in the manner previously described, the escapement will operate under the influence of the spring 119 until the sector disc 109 hits the post 130. This will leave the disc 117 in the position shown in Fig. 8. The handle 41 is in the position shown in Fig. 1. The person wishing to park inserts the appropriate coin in the slot 43 and if the same is accepted, the handle 41 may be rotated in the clockwise direction, as viewed in Fig. 1.

Displacement of the handle 41 discloses the red portion of the housing normally below the extension 129. When the handle 41 is rotated to its full extent, the teeth 68 on the disc 55 are moved past the pawl 69 and the disc 55 may return to its initial position when the handle 41 is released. If, however, the handle 41 is not rotated to its fullest extent, the handle is not permitted to return and the exposed red portion of the housing indicates this fact and draws the attention of the officials to the fact that the device has not been operated properly.

The defective operation may be cured by rotating the handle 41 to its fullest extent. The rotation of the handle 41 causes partial rotation of the sector disc 109 and the movement of the time disc 117 to a position indicating 30 minutes of parking time available. During this movement the pawls 112 slip over the teeth of the ratchet 114 and when the movement is terminated one of the pawls 112 engages one of the teeth of the ratchet with practically no backlash movement. The spring 119 immediately starts to rotate the disc 117 towards its initial position shown in Fig. 8, this direction being in the counterclockwise direction as viewed in that figure. It takes 30 minutes for the meter to attain zero position, that is, for the zero position on the disc 117 to arrive in alignment with the pointers 35. After this position is attained, the disc 117 continues to rotate, indicating on the red part of the dial the over-parking period.

The improved parking meter is not only simple in construction, but is very easy to maintain in operation. Thus, the escapement mechanism may be removed and replaced by merely removing and replacing the four screws 126. Furthermore, a great amount of the mechanism is mounted on the plate 101 and may be removed and replaced by simply removing four screws 103. The cash box 39 may be removed and replaced without opening the complete meter by any person having the appropriate keys. It may be noted that the counter 131 may be located so that it may be read when the door 36 is removed.

Although the invention has been described in connection with the specific details of a preferred embodiment thereof, it must be understood that such details are not intended to be limitative of the invention except in so far as set forth in the accompanying claims.

Having thus described our invention, what we claim as new and desire to secure by Letters Patent of the United States is:

1. In a parking meter, in combination, an elongated narrow housing comprising a major closure, a manually operated member on said housing, an arm carried by said member on the interior of the housing, a plate removably mounted on said housing, a timing disk and a tension spring mounted on said plate, a sector disk mounted on said plate for limited pivotal movement, gear elements operatively connecting said sector disk and said timing disk, abutment means on said arm and said sector disk adapted to cooperate whereby the timing disk is rotated and the spring tensioned when the manually operated member is actuated, said arm being adjustably mounted at desired positions on said member to control the degree to which said spring is tensioned, a timing escapement mechanism removably mounted on said plate, and overrunning clutch and separable clutch elements connecting said sector disk to said escapement mechanism.

2. In a parking meter, in combination, an elongated narrow housing comprising a major closure, a manually operated member on said housing, an arm carried by said member on the interior of the housing, a plate removably mounted on said housing, a timing disk and a tension spring mounted on said plate, a sector disk mounted on said plate for limited pivotal movement, gear elements operatively connecting said sector disk and said timing disk, abutment means on said arm and said sector disk adapted to cooperate whereby the timing disk is rotated and the spring tensioned when the manually operated member is actuated, said arm being adjustably mounted at desired positions on said member to control the degree to which said spring is tensioned, a timing escapement mechanism removably mounted on said plate, a multiplicity of pawls on said sector disk, a ratchet wheel cooperating therewith, said pawls being equidistantly spaced around the ratchet wheel, the number of said pawls and the number of teeth on the ratchet having no common factor, and separable clutch elements connecting said sector disk to said escapement mechanism.

3. In a parking meter, in combination, a manually operable member, coin actuated means for releasing said member for actuation, full-stroke mechanism cooperating with said member, means for returning said member to initial position at the end of a stroke, and a flag carried by said member on the exterior of said housing, the portion of said housing normally obscured by said flag being of a contrasting color to indicate incomplete operation of said member.

4. In a parking meter, in combination, a manually operable member, coin actuated means for releasing said member for actuation, full-stroke mechanism cooperating with said member, means for returning said member to initial position at the end of a stroke, clock mechanism including a time indicating disk, and an arm rigidly connected to said member adapted to cooperate with said clock mechanism whereby a full-stroke of the member moves the time indicating disk to a desired extent, said arm being adjustable on said member whereby the displacement of said disk on actuation of said member may be regulated at will.

ODE D. JENNINGS.
SIDNEY E. VAN TUYL.
EMERY MIHALEK.